(12) United States Patent
Lu et al.

(10) Patent No.: US 11,999,636 B2
(45) Date of Patent: Jun. 4, 2024

(54) METHOD FOR PURIFYING DYE-CONTAINING WASTEWATER BASED ON POROUS-POLYMER-MODIFIED METAL CARBON NANOTUBE COMPOSITE MEMBRANE

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 431 days.

(21) Appl. No.: 17/555,443

(22) Filed: Dec. 18, 2021

(65) Prior Publication Data
US 2022/0177333 A1 Jun. 9, 2022

Related U.S. Application Data

(63) Continuation of application No. PCT/CN2021/074572, filed on Jan. 31, 2021.

(30) Foreign Application Priority Data

Dec. 9, 2020 (CN) .......................... 202011449881.7

(51) Int. Cl.
*C02F 1/44* (2023.01)
*B01D 67/00* (2006.01)
(Continued)

(52) U.S. Cl.
CPC .......... *C02F 1/442* (2013.01); *B01D 67/0083* (2013.01); *B01D 67/0088* (2013.01); *B01D 69/12* (2013.01); *B01D 71/0212* (2022.08);
*B01D 71/022* (2013.01); *B01J 20/205* (2013.01); *B01J 20/262* (2013.01);
(Continued)

(58) Field of Classification Search
CPC ................ C02F 1/442; C02F 2101/308; C02F 2103/14; B01D 67/0083; B01D 67/0088; B01D 69/12; B01D 71/0212; B01D 71/022; B01D 71/021; B01D 71/60; B01J 20/205; B01J 20/262; B01J 20/28035; B01J 20/3204; B01J 20/3223; B01J 20/3272; B01J 20/3297
See application file for complete search history.

(56) References Cited

U.S. PATENT DOCUMENTS

2018/0065105 A1 3/2018 Song et al.

FOREIGN PATENT DOCUMENTS

| CN | 106102885 A | 11/2016 |
|---|---|---|
| CN | 107519849 A | 12/2017 |

(Continued)

*Primary Examiner* — Waqaas Ali
(74) *Attorney, Agent, or Firm* — SZDC Law PC

(57) ABSTRACT

A method for purifying dye-containing wastewater based on a porous-polymer-modified metal carbon nanotube membrane includes: (1) preparing the porous-polymer-modified metal carbon nanotube membrane; and (2) passing the dye-containing wastewater through the porous-polymer-modified metal carbon nanotube membrane to remove dyes in the dye-containing wastewater. A device for purifying dye-containing wastewater is also disclosed. The device includes the porous-polymer-based metal carbon nanotube membrane.

13 Claims, 5 Drawing Sheets

(51) Int. Cl.
  *B01D 69/12*  (2006.01)
  *B01D 71/02*  (2006.01)
  *B01J 20/20*  (2006.01)
  *B01J 20/26*  (2006.01)
  *B01J 20/28*  (2006.01)
  *B01J 20/32*  (2006.01)
  *C02F 101/30* (2006.01)

(52) U.S. Cl.
  CPC ..... *B01J 20/28035* (2013.01); *B01J 20/3204* (2013.01); *B01J 20/3223* (2013.01); *B01J 20/3272* (2013.01); *B01J 20/3297* (2013.01); *C02F 2101/308* (2013.01)

(56) References Cited

FOREIGN PATENT DOCUMENTS

| | | | |
|---|---|---|---|
| CN | 107570111 A | * | 1/2018 |
| CN | 107570111 A | | 1/2018 |
| CN | 110038450 A | | 7/2019 |
| CN | 111298664 A | | 6/2020 |
| CN | 11264229 A | | 4/2021 |

* cited by examiner

METHOD FOR PURIFYING DYE-CONTAINING WASTEWATER BASED ON POROUS-POLYMER-MODIFIED METAL CARBON NANOTUBE COMPOSITE MEMBRANE

This application is a Continuation Application of PCT/CN2021/074572, filed on Jan. 31, 2021, which claims priority to Chinese Patent Application No. 202011449881.7, filed on Dec. 9, 2020, which is incorporated by reference for all purposes as if fully set forth herein.

TECHNICAL FIELD

The invention belongs to the technical field of functional materials, and particularly a method for purifying dye-containing wastewater based on porous-polymer-modified metal carbon nanotube composite membrane.

BACKGROUND TECHNIQUE

In the textile printing and dyeing industry, the amount of dyes used is very large, and the industrial wastewater often contains variety of dyes. It has caused most water contamination. Dyes in wastewater are able to absorb the light and reduce the transparency of water and affect the growth of aquatic organisms and microorganisms, and are not good at self-purification of water, and even effect human's healthy seriously. There have been various processes of water purification for removing the dyes in wastewater, such as chemical oxidation, adsorption, photodegradation, biodegradation, membrane separation and so on. They have their own advantages and disadvantages. Nevertheless, it is noteworthy that the nanofiltration membrane purification method has a very broad application prospect, due to its high efficiency, low energy consumption and environmental friendliness. The prior art discloses a preparation method of super hydrophilic carbon nanotube nano porous membrane: adding carbon nanotubes, tannic acid and chitosan into the water, adjusting pH and dispersing, and forming dispersion; after standing, filtering the diluted dispersion onto a mixed cellulose membrane in the vacuum to obtain carbon nanotube self-assembled membrane; immersing carbon nanotube self-assembled membrane after drying in vacuum into metal ion solution, picking up the membrane, and washing to obtain super hydrophilic carbon nanotube nano porous membrane. The preparation method has a simple process, easy operation and low cost. The obtained carbon nanotube nano porous membrane had super hydrophilic characteristics. But it has low separation efficiency. The separation efficiency is less than 60% of 100 ppm dye aqueous solution. Therefore, there is a need to develop the new solution, in order to bring the advantages of nanofiltration membrane separation into full play.

TECHNICAL PROBLEM

The object of the present invention is to separate dye with a new carbon membrane material, which has more advanced performance of the separation efficiency of dyestuff, and has more wide application.

TECHNICAL SOLUTIONS

In order to achieve the above-mentioned object of the invention, the technical solution adopted by the present invention is:

1. A method for purifying dye-containing wastewater based on a porous-polymer-modified metal carbon nanotube composite membrane, which comprises the following steps:

(1) mixing acidified carbon nanotube film with a modification solution and then heating to react to obtain a modified carbon nanotube film; then coating the surface of the modified carbon nanotube film with polyethylene glycol, and then coating with a porous polymer solution, and heating to obtain the porous polymer-modified metal carbon nanotube composite membrane; the modification solution comprising a zirconium salt, terephthalic acid, acetic acid, and a solvent; a method of preparing the porous polymer in the porous polymer solution comprising, under nitrogen atmosphere, in the presence of anhydrous potassium carbonate, subjecting 2,3,5,6-tetrafluoroterephthalonitrile and 5,5',6,6'-tetrahydroxy-3,3',4,4'-tetramethyl-1,1'-spiralbisindan to a polymerization reaction, and after the reaction is completed, precipitating a product in methanol, and dissolving the product in chloroform, precipitating in methanol, and boiling in water to obtain the porous polymer.

(2) passing the dye-containing wastewater through the porous polymer-modified metal carbon nanotube composite membrane to complete purifying the dye-containing wastewater.

In the present invention, dyes include congo red, rhodamine B, methyl orange, chrome black T, acid fuchsin, methyl blue, or active black. Preferably, purifying dye-containing wastewater is completed under argon pressure.

In the present invention, a carbon nanotube membrane is immersed in aqua regia for acidification to obtain the acidified carbon nanotube membrane. The carbon nanotube membrane is an existing product.

In the present invention, the zirconium salt is zirconium tetrachloride, and a ratio of the zirconium salt:terephthalic acid:acetic acid is (0.1 to 0.12) g:(0.08 to 0.09) g:(8 to 8.5) mL.

In the present invention, the heating is conducting at 115° C. to 125° C. for 20 to 25 hours; and the polymerization reaction is conducted at 150° C. to 170 C for 45 to 60 minutes; and the heating treatment is conducted at 110° C. to 130° C. for 5 to 7 hours.

In the present invention, the coating is spin-coating or spraying.

In the present invention, a weight ratio of anhydrous potassium carbonate:2,3,5,6-tetrafluoroterephthalonitrile:5,5',6,6'-tetrahydroxy-3,3',4,4'-tetramethyl-1,1'-spiralbisindan is (65 to 70):12:(20 to 22).

In the present invention, the polymerization reaction is conducted at 150 to 170° C. for 45 to 60 minutes; preferably, at 160° C. for 50 minutes; preferably, toluene is added very 10 minutes during the reaction.

In the present invention, the heat treatment is conducted at 110 to 130° C. for 5 to 7 hours; preferably, at 120° C. for 6 hours.

BENEFICIAL EFFECTS

Replacing the filter membrane in an existing filter with the porous polymer-modified metal carbon nanotube composite membrane of the present invention and leaving the rest unchanged, results a device for purifying dye-containing wastewater. Thus, the present invention discloses a device for purifying dye-containing wastewater that includes the above-mentioned porous polymer-modified metal carbon nanotube composite membrane. Further, the device for purifying dye-containing wastewater is a filter device. The inventiveness of the present invention is to provide a new filter membrane, which realizes the high-efficiency separation of a variety of dye wastewater under the existing filtration process.

In the present invention, the metal carbon nanotube composite membrane coated with porous polymer is successfully prepared, and a high-efficiency nanofiltration separation of various dyes is realized. The separation efficiency for various dyes reaches at 90% or higher. The composite membrane can have suitable pore size and porosity required for separation. The polymer coating mainly functions to enhance the stability and durability of the membrane, and solves the crystal defects that may occur during the metal growth process. In addition, the membrane material is easy to manufacture, has a wide range of separation applicability, and had great application potential.

DETAILED DESCRIPTION

Figure 1:
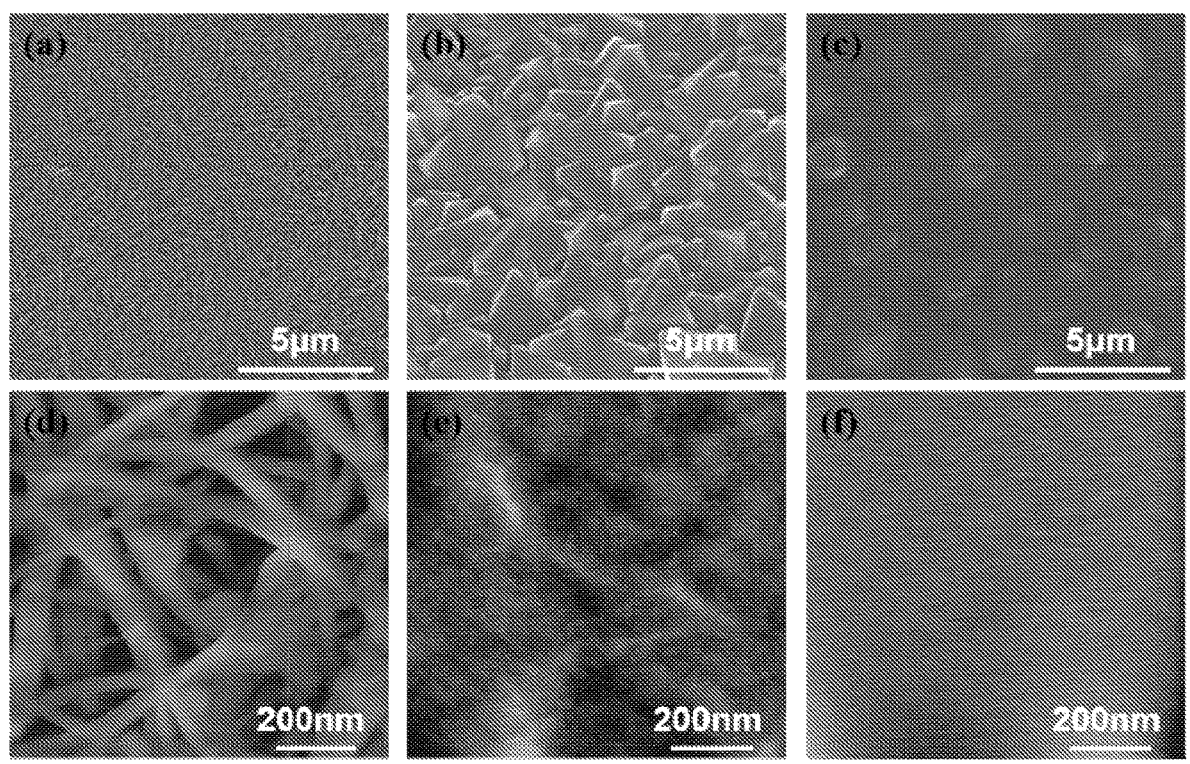
FIG. 1 shows scanning electron microscope images and an atomic force microscope images of the MWCNT film before and after modification.

The raw materials used in the present invention are all commercially available products, and the specific preparation operations and testing methods are all conventional methods in the field.

Preparation Example: Preparation of porous-polymer-modified metal carbon nanotube composite membrane. The specific steps are as follows:

(1) Synthesis of modified multi-walled carbon nanotube (MWCNT) film. First, mixed 30 ml of concenrated hydrochloric acid and 10 ml of concentrated nitric acid were mixed with the volume ratio of 3:1 to prepare aqua regia. A MWCNT film was placed into aqua regia and soaked at 50° C. for 6 hours for acidification. The acidified MWCNT film was washed with ultrapure water and dried. Accurately weighing 0.112 g of zirconium tetrachloride and 0.087 g of terephthalic acid, dissolving them in 60 ml of N,N-dimethylformamide (DMF), and then sonicating for 20 minutes, then adding 8.3 ml of acetic acid to obtain a mixture. The mixture and the acidified dried MWCNT film (10*10 cm$^2$) were transferred to a 100 ml stainless steel autoclave, heated at 120° C. for 24 hours, after natural cooling, washed with DMF and methanol. Finally, it was dried at 60° C. for 12 hours to obtain a modified metal MWCNT film;

(2) Preparation of porous polymer. Weighing 12.0 g of 2,3,5,6-tetrafluoroterephthalonitrile and placing it in a dry three-necked flask. Under $N_2$ atmosphere, adding 50 ml of DMF, and then weighing 20.4 g of recrystallized 5,5',6,6'-tetrahydroxy-3,3',4,4'-tetramethyl-1,1'-spiralbisindan (TTSBI), adding to a flask and stir to dissolve; then adding 67.0 g of anhydrous potassium carbonate, stirring well, heating the reaction in oil bath at 160° C.; during this period, adding 5 ml of anhydrous toluene to the reaction every 10 minutes, stopping the reaction after 50 minutes; cooling to room temperature, pouring the product into 600 ml of methanol, and precipitating was precipitated. The precipitate was dissolved in 100 ml of chloroform, and after complete dissolution, pouring 500 ml of methanol to precipitate, filtering the precipitate, and repeating the dissolution/precipitation operation 4 times to obtain a fluorescent yellow precipitate finally. The obtained precipitate was cut into small pieces, placed in ultrapure water, boiled for 5 hours, filtered, washed with ultrapure water and ethanol, repeated three times, placed in a vacuum oven at 80° C., and dried for 12 hours to obtain 15.1 g of yellow solid, i.e., a porous polymer;

(3) Preparation of composite membrane. Dissolving 1.0 g of polyethylene glycol diglycidyl ether (PEGDEG) in 19 g of methanol to prepare Solution 1 with 5 wt % PEGDEG. The Solution 1 was evenly spin-coated on the metal-loaded modified MWCNT film, and dried at room temperature to obtain polyethylene glycol modified film. Dissolving 1.0 g of porous polymer in 20 ml of DMF, then adding 0.1 g of branched polyethyleneimine (PEI) to prepare Solution 2; spraying the Solution 2 evenly on the polyethylene glycol modified film, then putted it in an oven and heated it at 120° C. for 6 hours to obtain a composite film product.

In FIG. 1, (a) and (d) are unmodified MWCNT films, (b) and (e) are modified metal MWCNT films, and (c) and (f) are modified metal MWCNT films (composite films) coated with porous polymers; metals and porous polymers are visible. All have been successfully modified on the MWCNT film.

Seven typical dye solutions were prepared by conventional methods. Adding congo red, rhodamine B, methyl orange, chrome black T, acid fuchsin, methyl blue, and reactive black into 100 ml of water to prepare a single-component solution with the concentration of 100 ppm, i.e., dye-containing wastewater, used in the following tests.

According to the normal operation, the membrane was fixed in the high-pressure stirring tank of filter equipment Sterlitech HP4750, pouring a corresponding dye solution, and adding argon gas to pressurize to 3.0 bar, under pressure, purifying the dye wastewater. The specific operation follows normal procedures.

EXAMPLE 1

100 ppm of congo red aqueous solution was introduced into the high-pressure stirring tank of the filter equipment, and adding argon to pressurize to 3.0 bar., under the pressure, purifying dye-containing wastewater was completed. The filter membrane was modified metal MWCNT film or modified metal MWCNT film with porous polymer.

Figure 2:
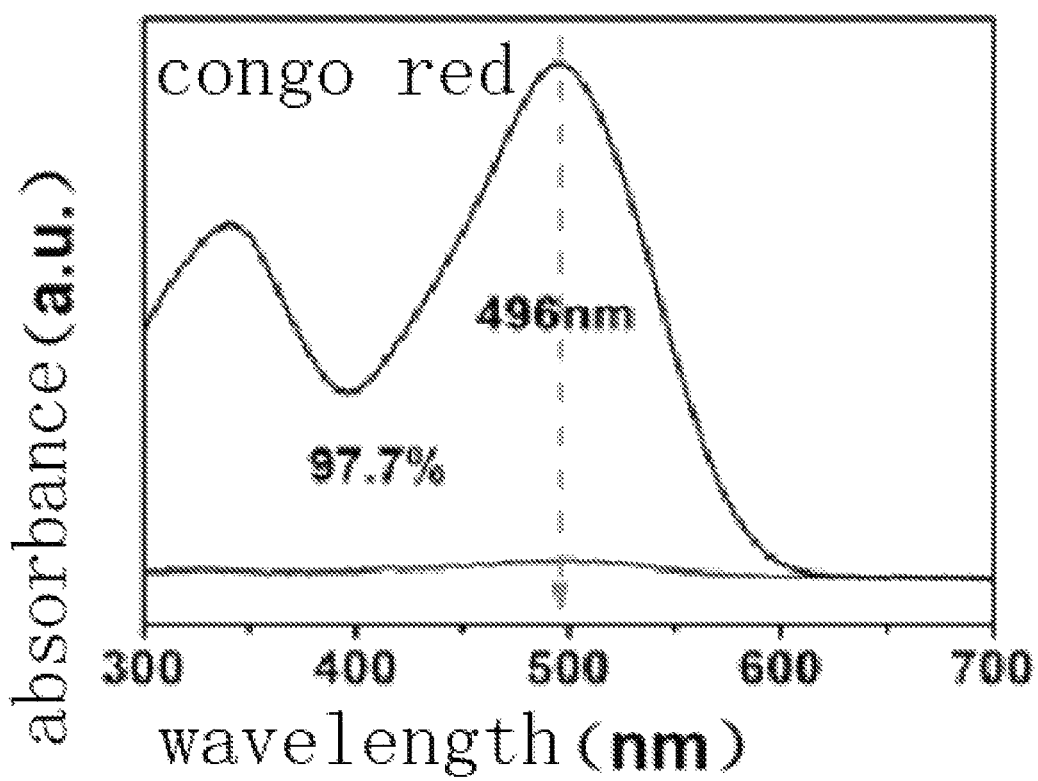
FIG. 2 shows the result of the dye separation efficiency of congo red with modified metal composite membrane with porous polymer.
Figure 3:
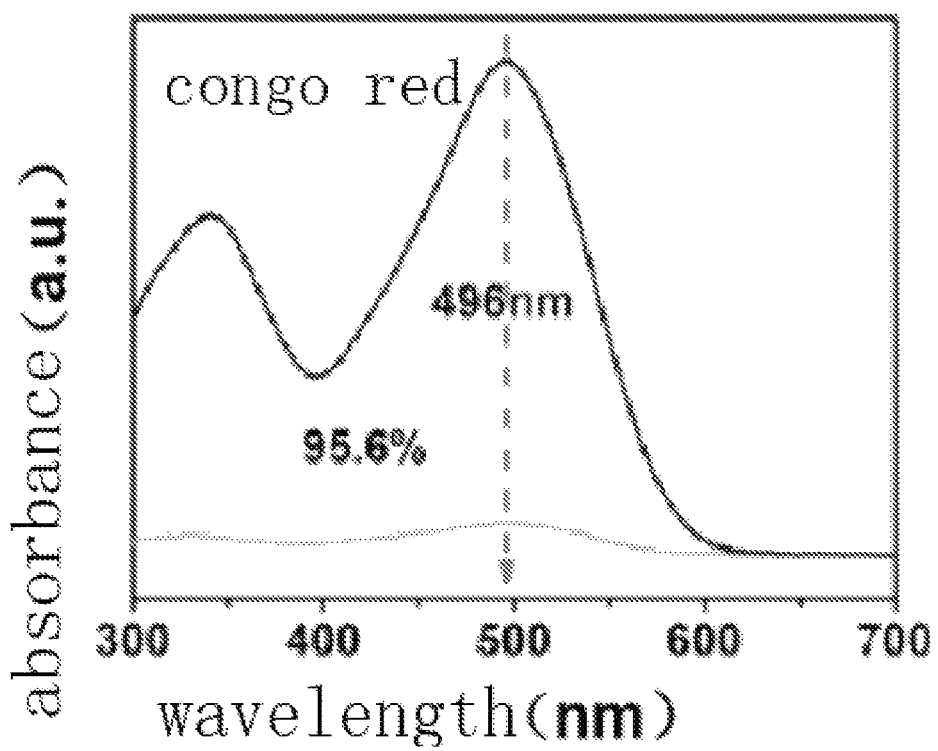
FIG. 3 shows the result of the dye separation efficiency of congo red modified metal MWCNT film.
Figure 4:
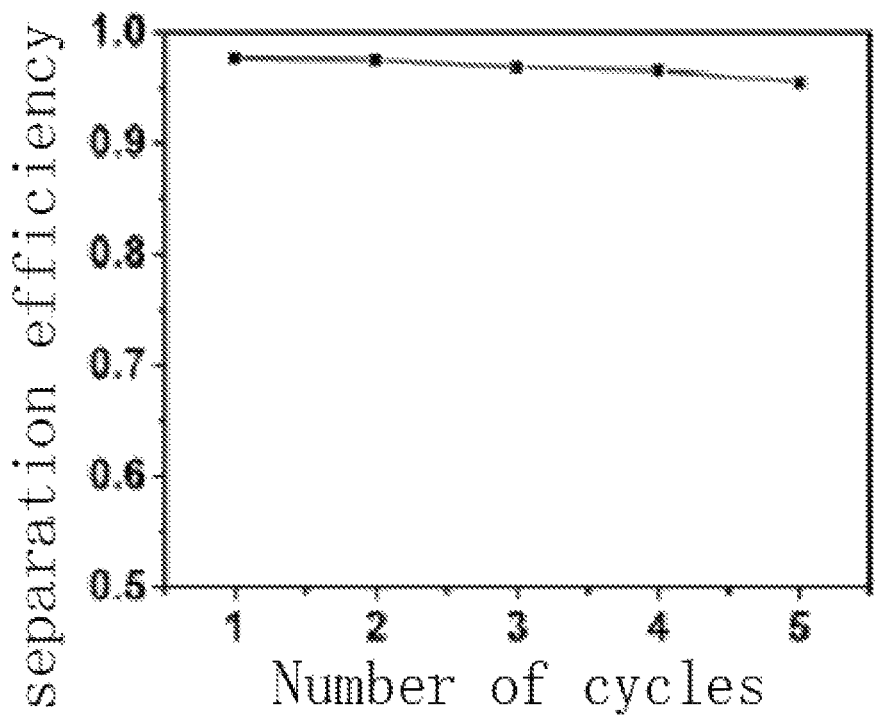
FIG. 4 shows the result of the recycling separation efficiency of congo red with modified metal composite membrane with porous polymer.

As shown in FIG. 2, the separation efficiency of the modified metal composite membrane coated with porous polymer was 97.7% (congo red). As shown in FIG. 3, the separation efficiency of the modified metal MWCNT membrane was 95.6% (congo red). At the same time, the cyclic separation effect of the dye solution was tested. After one separation, it was washed with water, dried and then separated again. As shown in FIG. 4, after 5 cycles, the separation efficiency of the modified metal composite membrane coated with porous polymer on congo red was still at above 95%, indicating that the modified composite membrane coated with porous polymer can be continuously used, and a membrane material for dye separation had been successfully prepared.

EXAMPLE 2

100 ppm of the rhodamine B aqueous solution was introduced into the high-pressure stirring tank of the filter equipment, and the argon was added to pressurize to 3.0 bar. Under the pressure, purifying dye-containing wastewater was completed; the filter membrane was modified metal MWCNT film or modified metal MWCNT film with porous polymer.

Figure 5:
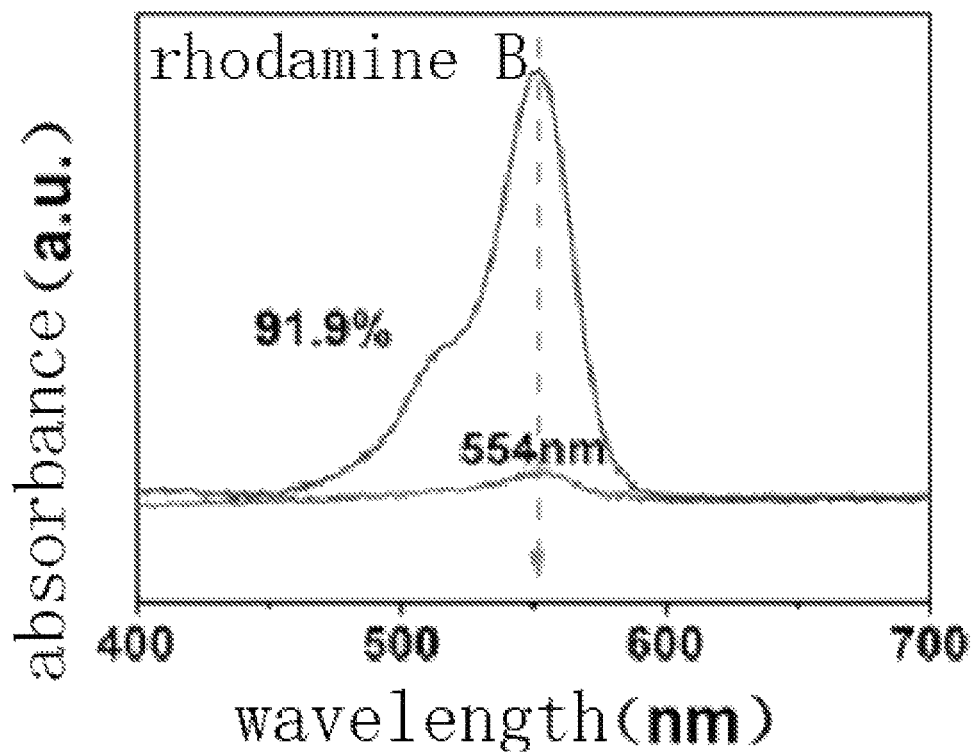
FIG. 5 shows the result of the dye separation efficiency of rhodamine B with modified metal composite membrane with porous polymer.
Figure 6:
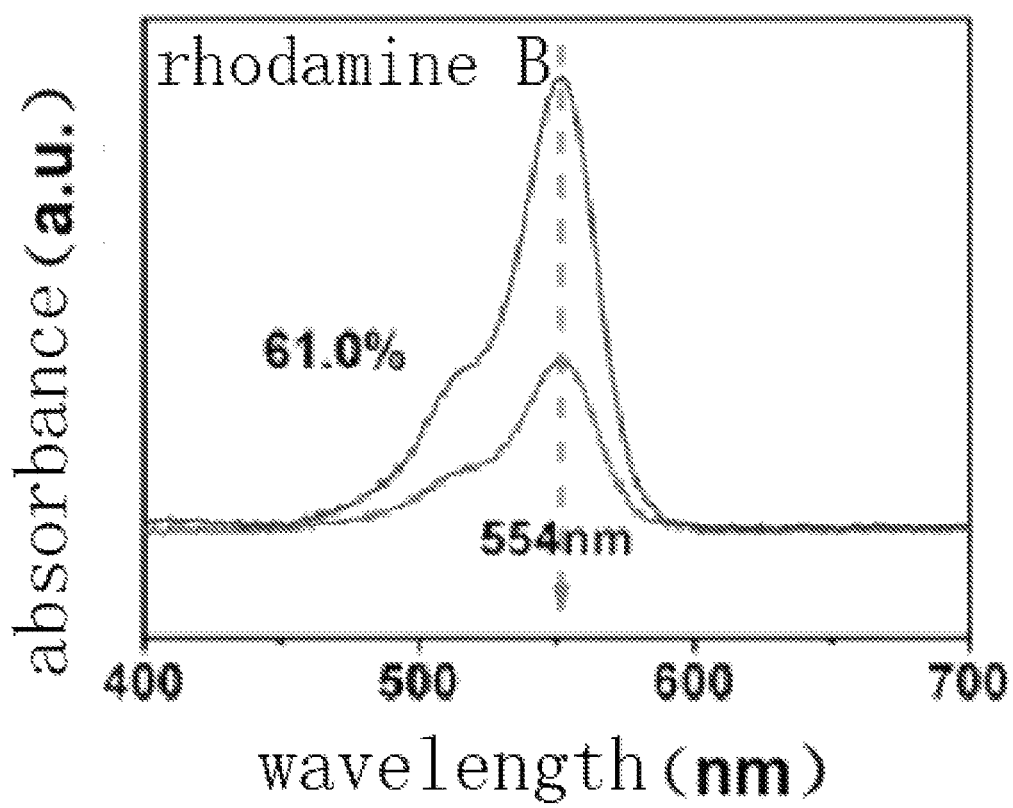
FIG. 6 shows the result of the dye separation efficiency of rhodamine B with metal loaded modified metal MWCNT film.
Figure 7:
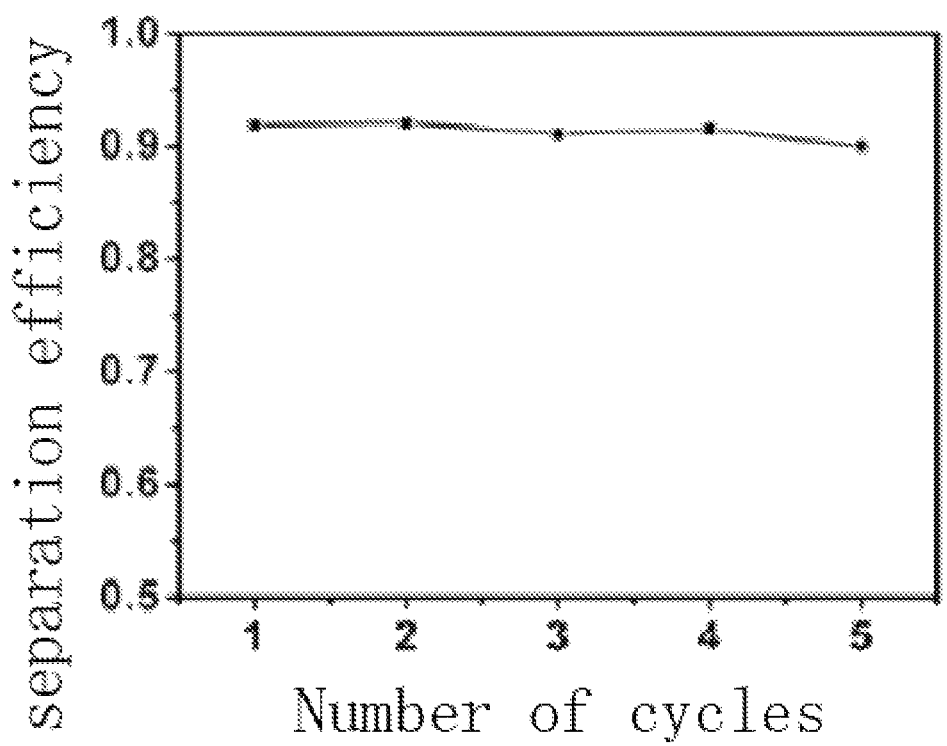
FIG. 7 shows the result of the recycling separation efficiency of rhodamine B modified metal composite membrane with porous polymer.

As shown in FIG. 5, the separation efficiency of the modified metal composite membrane with porous polymer was 91.9% (rhodamine B). As shown in FIG. 6, the separation efficiency of the modified metal MWCNT membrane was 61.0% (rhodamine B). The separation efficiency of the modified membrane with porous polymer was significantly improved. At the same time, the cyclic separation effect of the dye solution was tested. After one separation, it was washed with water, dried and then separated again. As shown in FIG. 7, after 5 cycles, the separation efficiency of the modified metal composite membrane coated with porous polymer on rhodamine B was still at above 90%, indicating that the modified composite membrane coated with porous polymer can be continuously separated, and a membrane material for dye separation had been successfully prepared.

In addition, a comparative experiment was carried out. The separation efficiency of the acidified MWCNT membrane for rhodamine B was 42.3%, and the separation efficiency of the polyethylene glycol modified membrane for rhodamine B was 63.7%.
Control Example:

Based on Example 1, the Solution 2 was uniformly sprayed on the modified MWCNT film loaded with metal, that is, without polyethylene glycol modification. Other conditions were the same. The obtained composite film has 88.2% of the separation efficiency for rhodamine B. The separation efficiency for second separation dropped to 85.1%, and the third to 75.9%.

Based on Example 1, heating at 120° C. for 6 hours was modified to heating at 120° C. for 10 hours. Other conditions were the same. The obtained composite membrane separation efficiency was 85.7% with rhodamine B.

Based on Example 1, the preparation of the porous polymer was adjusted from 160° C. for 50 minutes to 140° C. for 3 hours. Other conditions were the same. The obtained composite membrane separation efficiency was 83.1% with rhodamine B.

Based on Example 1, heating at 120° C. for 24 hours was modified to 150° C. for 15 hours Others are the same. The obtained composite membrane separation efficiency was 79.6% with rhodamine B.

EXAMPLE 3

Dye separation performance test of composite membrane modified with porous polymer: The separation efficiency of the composite membrane for dyes of different molecular weights was tested. The results were shown that the separation efficiency of the membrane for various dyes with molecular weighted ranging from 200 to 1300 were all above 90%, indicating that the separation performance of the composite membrane had a wide range of applicability. In addition, chrome black T was selected as the dye for the test film cycle performance experiment. After 10 cycles, the separation efficiency of chrome black T decreased from 98% to 96%, and the separation flux remained above 40 L m$^{-2}$ s$^{-1}$ MPa$^{-1}$, indicating that the composite membrane modified with porous polymer can effectively maintain separation performance after repeated separations.

Figure 8:
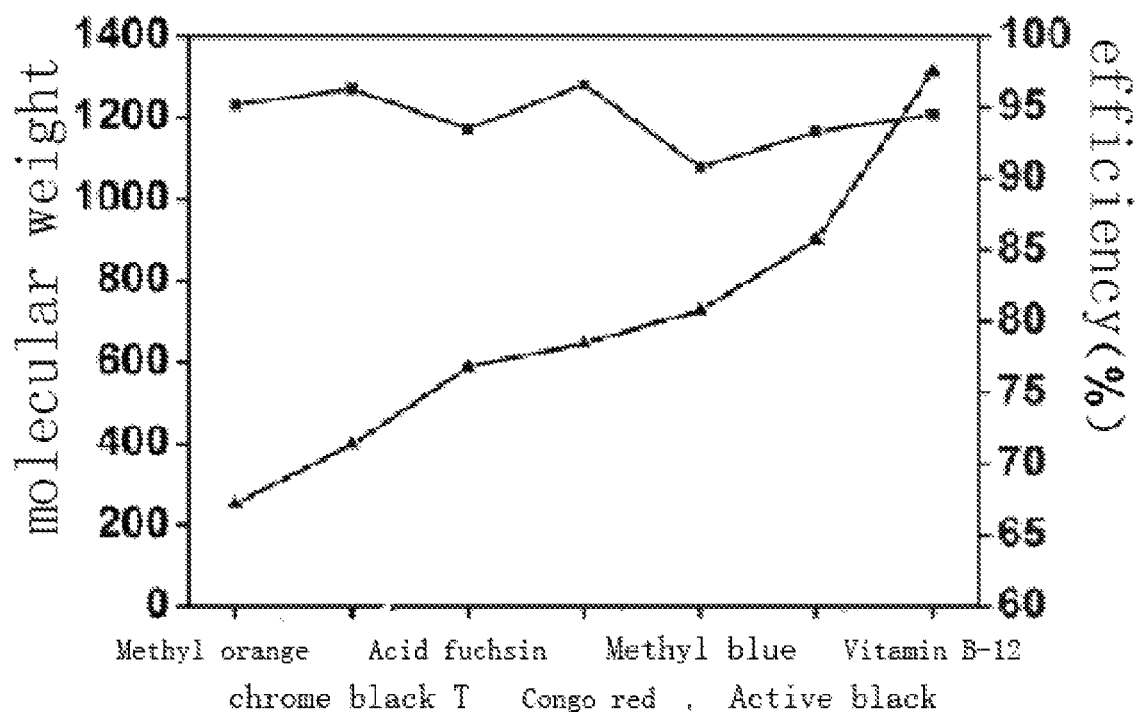
FIG. 8 shows the result of the separation efficiency with different molecular weight of dyes.
Figure 9:
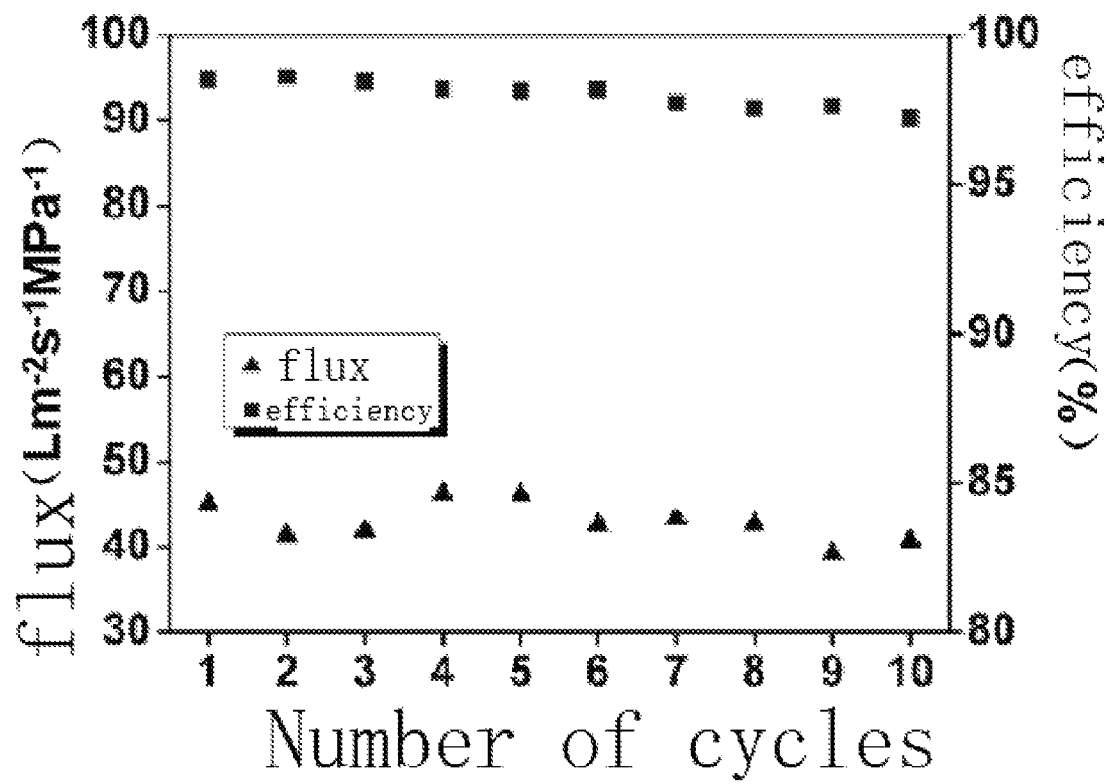
FIG. 9 shows the result of the recycling separation efficiency and flux of chrome black T.

FIG. 8 shows the result of the separation efficiency with different molecular weight of dyestuff; FIG. 9 shows the result of the recycling separation efficiency and flux of chrome black T.

Summary: In this invention, a composite membrane modified with a porous polymer was successfully prepared, and a high efficiency nanofiltration separation of a variety of dyes was achieved. The separation efficiency of various dyes tested reached 90% or higher. The composite membrane modified with porous polymer can provide the appropriate pore size and porosity required for dye separation, and the membrane has good stability and durability, and solves the problem of metal crystal defects that may appear during the growth process. In addition, the membrane material is easy to manufacture, has a wide range of dye separation applicability, and has great application potential.

The invention claimed is:
1. A method for purifying dye-containing wastewater based on a porous-polymer-modified metal carbon nanotube membrane, comprising:
(1) preparing the porous-polymer-modified metal carbon nanotube membrane, which comprises:
immersing a carbon nanotube membrane in aqua regia for acidification to obtain an acidified carbon nanotube membrane;
preparing a modification solution that includes a zirconium salt, terephthalic acid, acetic acid, and a solvent;
heating the acidified carbon nanotube membrane in the modification solution and reacting to obtain a metal carbon nanotube membrane;
conducting a polymerization reaction of 2,3,5,6-tetrafluoroterephthalonitrile and 5,5',6,6'-tetrahydroxy-3,3',4,4'-tetramethyl-1,1'-spiralbisindan, under nitrogen atmosphere and in the presence of anhydrous potassium carbonate, to obtain a crude polymer product;
precipitating the crude polymer product in methanol, dissolving the crude product in chloroform, precipitating the crude polymer product in methanol, and heating the crude polymer product in water to obtain a porous polymer;
preparing a polyethylene glycol diglycidyl ether (PEG-DEG) solution and coating the metal carbon nanotube membrane with the polyethylene glycol diglycidyl ether solution;
preparing a porous polymer solution and coating the metal carbon nanotube membrane with the porous polymer solution; and
heating the metal carbon nanotube membrane to obtain the porous-polymer-modified metal carbon nanotube membrane; and

(2) passing the dye-containing wastewater through the porous-polymer-modified metal carbon nanotube membrane to remove dyes in the dye-containing wastewater.

2. The method of claim 1, wherein the dyes are one or more selected form the group consisting of congo red, rhodamine B, methyl orange, chrome black T, acid fuchsin, methyl blue, and active black.

3. The method of claim 1, wherein the dyes are removed under argon.

4. The method of claim 1, wherein for the modification solution, the zirconium salt is zirconium tetrachloride; the solvent is N,N-dimethylformamide; and a ratio of the zirconium salt, terephthalic acid, and acetic acid is (0.1 to 0.12)g:(0.08 to 0.09)g:(8 to 8.5) ml.

5. The method of claim 1, wherein a weight ratio of anhydrous potassium carbonate:2,3,5,6-tetrafluoroterephthalonitrile:5,5',6,6'-tetrahydroxy-3,3',4,4'-tetramethyl-1,1'-spiralbsindan is (65 to 70):12:(20 to 22).

6. The method of claim 1, wherein the polyethylene glycol diglycidyl ether solution is a methanol solution that includes 5 wt % of polyethylene glycol diglycidyl ether.

7. The method of claim 1, wherein the porous polymer solution is an N,N-dimethylformamide (DMF) solution that includes 0.05 g/ml of the porous polymer and 0.005 g/ml of branched polyethyleneimine (PEI).

8. The method of claim 1, wherein the acidified carbon nanotube membrane is heated in the modification solution at 115° C. to 125° C. for 20 to 25 hours.

9. The method of claim 1, wherein the polymerization reaction is conducted at 150° C. to 170° C. for 45 to 60 minutes.

10. The method of claim 1, wherein the metal carbon nanotube membrane is heated at 110° C. to 130° C. for 5 to 7 hours to obtain the porous-polymer-modified metal carbon nanotube membrane.

11. The method of claim 1, wherein the coating the metal carbon nanotube membrane with the polyethylene glycol diglycidyl ether (PEGDEG) solution is spin-coating or spraying; and the coating the metal carbon nanotube membrane with the porous polymer solution is spin-coating or spraying.

12. A device for purifying dye-containing wastewater, wherein the device comprises the porous-polymer-based metal carbon nanotube membrane of claim 1.

13. The device for purifying dye-containing wastewater according to claim 12, wherein the device is a filter device.

* * * * *